Dec. 4, 1962   R. L. ANDERSON ETAL   3,067,387
P-N JUNCTION POSITION DETERMINATION
Filed July 14, 1959

INVENTORS
Richard L. Anderson &
Mary J. O'Rourke

BY Sughrue, Rothwell, Mion & Zinn
ATTORNEYS

United States Patent Office 3,067,387
Patented Dec. 4, 1962

3,067,387
P-N JUNCTION POSITION DETERMINATION
Richard L. Anderson, Poughkeepsie, and Mary J. O'Rourke, Pleasant Valley, N.Y., assignors to International Business Machines Corporation, New York, N.Y., a corporation of New York
Filed July 14, 1959, Ser. No. 827,012
1 Claim. (Cl. 324—158)

This invention relates to a method of optically testing semiconductor devices and more specifically to a method for determining the position of a P-N junction.

Various techniques have been used in the past for locating P-N junctions. These techniques have included etching of either the N or P-type material, probing the surface with hot and cold contacts or by moving a probe over the surface while a signal is applied thereto and the output monitored, and scanning the region of the junction with a light beam. All of these techniques have for one reason or another provided relatively inaccurate determinations. For instance, since the junction transition area has a finite width, these methods do not accurately locate the junction within this area. The present method in accordance with this invention adapts a novel approach which provides junction location of a high degree of accuracy. This novel method involves illuminating the semiconductor material containing the junction so as to lower the potential barrier or effectively biasing the junction in the forward direction. A contact is made to one side of the junction and a probe is made to traverse the region of the junction. The voltage between the probe and the contact is measured as a function of probe position.

It is therefore an object of this invention to provide a method of P-N junction position determination which is accurate and simple in operation.

The above and other objects will be apparent from a detailed description of the accompanying drawings.

Figure 1:
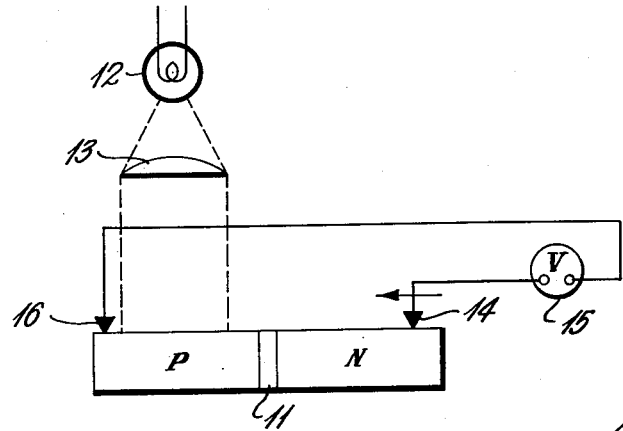
FIGURE 1 is a diagrammatic showing of the means by which the method of this invention is accomplished.
Figure 2:
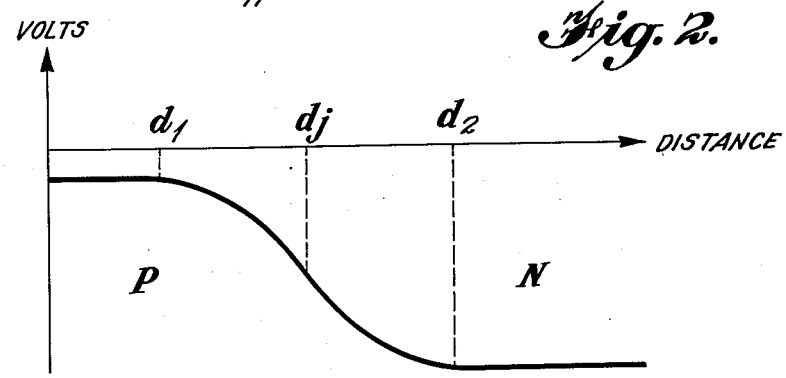
FIGURE 2 is a plot of volts versus distance as the probe traverses the junction of the semiconductor material.

Turning to FIGURE 1, the diode 10 has the usual P region and N region and a junction region identified by numeral 11. The source of light 12 by some optical means such as a lens 13 illuminates the diode. A lens system need not be used, however, since the surface of the diode may be flooded from any direction. The area of illumination on the semiconductor material should be within a diffusion length of the junction so that the light source will produce carriers to traverse the junction. The probe 14 traverses the junction, making electrical contact with the surface of the diode during the traverse. The plot of volts against distance for the particular embodiment shown in FIGURE 1 is shown in FIGURE 2. As the probe approaches the junction area the reading of the voltmeter 15, which measures the voltage drop between the probe 14 and the point contact 16, remains substantially constant, until the junction region is reached at distance $d_1$. Then as can be seen, the reading of the voltmeter increases and achieves a level which becomes constant at distance $d_2$. In the event that the junction is linearly graded the junction position is located at the center of the junction region (position $d_j$). Most junctions can be made to be essentially linearly graded by biasing sufficiently in the forward direction. To achieve this it is merely necessary to increase the intensity of illumination.

Figure 3:
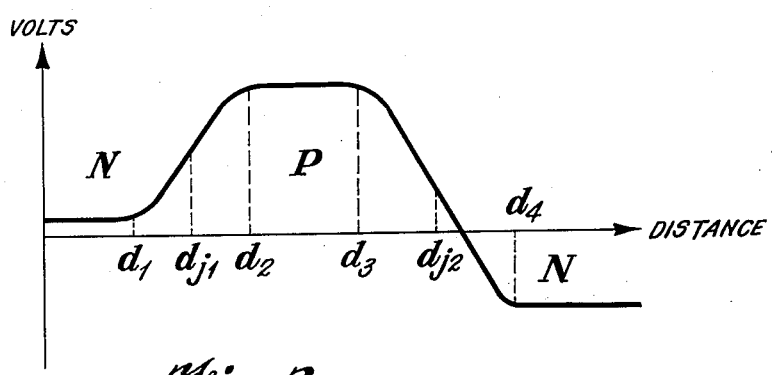
FIGURE 3 is a plot similar to FIGURE 2 but showing the results obtained when a transistor is scanned.

Turning to FIGURE 3, there is a plot of the traverse of an N-P-N transistor. The same techniques are used here in locating the center of the first junction area $d_{j1}$ and the center of the second junction area $d_{j2}$.

It can be seen that by biasing the junction using light the method does not involve obtaining voltage drops in the bulk material, as in the case when the junction is biased electrically. Additionally, this method does not involve the use of ohmic contacts. With the light source on the same side of the surface as the probe, surface states do not affect the results because the direction of illumination is such that the material under the probe is shaded by the probe and the surface in contact with the probe is then at equilibrium. Therefore, since the measured voltage is not affected by surface properties, a plot of voltage vs. probe position yields an extremely smooth curve. The junction position can be obtained from this smooth curve to a high degree of accuracy. Measurements accurate to 5 micro inches can be made. This, however, is not a limiting degree of accuracy.

By the method of this invention the impurity gradient can be calculated for a linearly graded junction taking into account the width of the transition region. For an abrupt junction, the net ionized impurity density for the two sides of the junction can be calculated if the shape and width of the transition region is taken into account.

What has been disclosed is one embodiment of the present invention. Other embodiments obvious to those skilled in the art from the teaching herein are contemplated to be within the spirit and scope of the accompanying claim.

What is claimed is:

A method of investigating the junction between two dissimilar layers of a semiconductor device that utilizes only a single biasing means, said biasing means being photovoltaic in nature, which comprises illuminating only one of said semiconductor layers to within at least one diffusion length of said junction with a source of radiant energy of sufficient intensity to bias said junction in the forward direction, traversing the surface of said semiconductor device with a probe in electrical contact therewith, measuring and plotting the voltage generated by said illumination between said probe and a fixed point on said surface to obtain a voltage vs. probe position relationship and determining from said relationship the position and characteristics of said junction.

References Cited in the file of this patent

UNITED STATES PATENTS

| | | |
|---|---|---|
| 2,669,692 | Pearson | Feb. 16, 1954 |
| 2,748,235 | Wallace | May 29, 1956 |
| 2,748,349 | Dickten | May 29, 1956 |
| 2,790,952 | Pietenpol | Apr. 30, 1957 |
| 2,802,160 | Engeler | Aug. 6, 1957 |
| 2,951,204 | Lemson | Aug. 30, 1960 |

OTHER REFERENCES

The Sylvania Technologist, vol. IV, No. 3, July 1951, published by Sylvania Electric Products Inc.